Nov. 9, 1965    D. J. BLACKWELL    3,216,394
ILLUMINATED INDICATING INSTRUMENT
Filed July 14, 1964    2 Sheets-Sheet 1
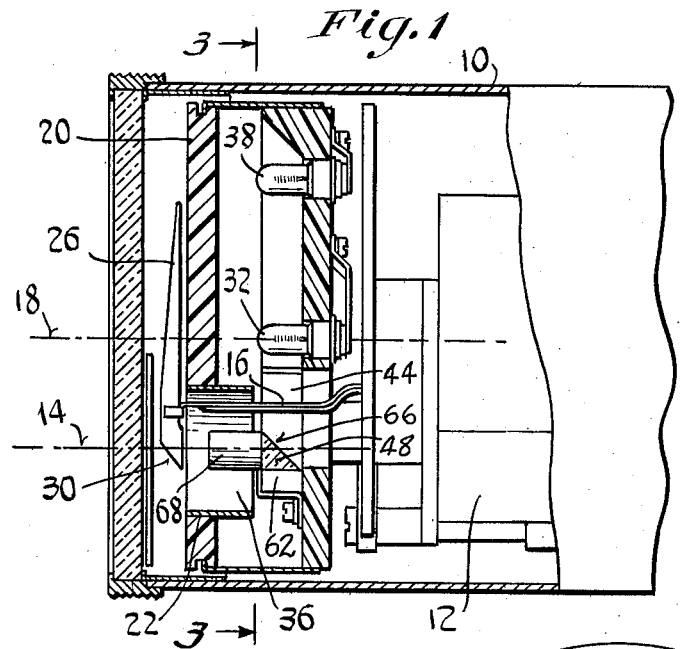
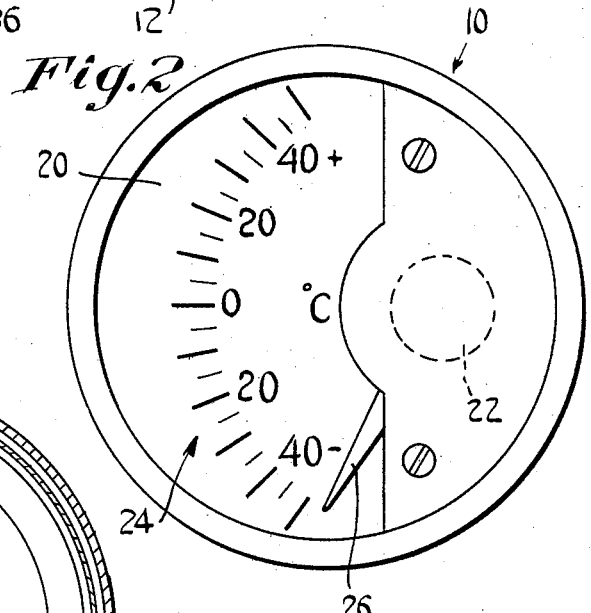
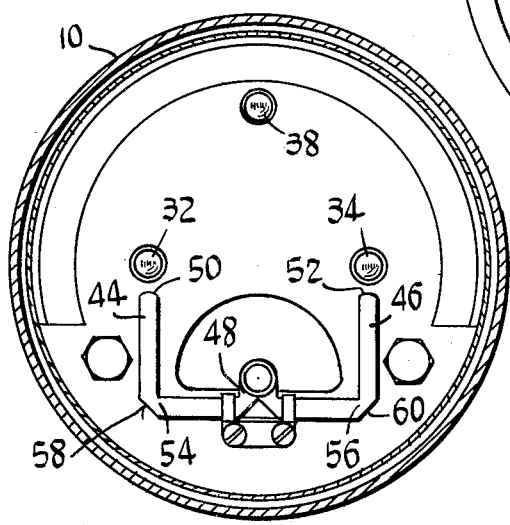
INVENTOR.
Dana J. Blackwell
BY
H. Gibner Lehmann
AGENT Nov. 9, 1965  D. J. BLACKWELL  3,216,394
ILLUMINATED INDICATING INSTRUMENT
Filed July 14, 1964  2 Sheets-Sheet 2
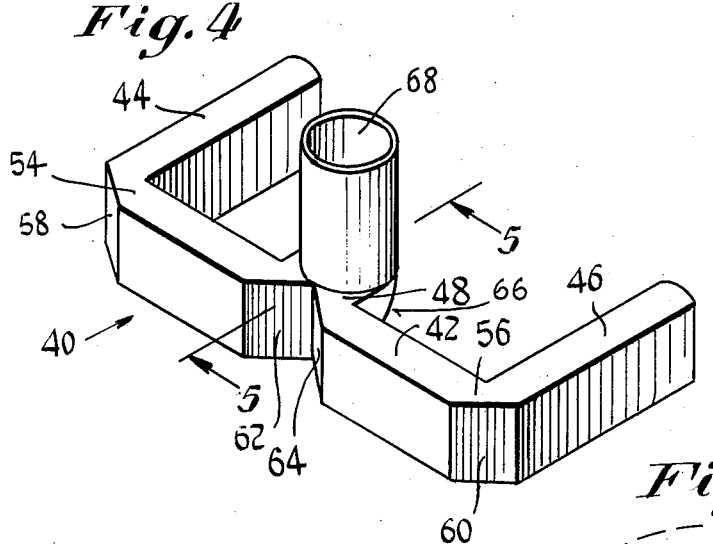
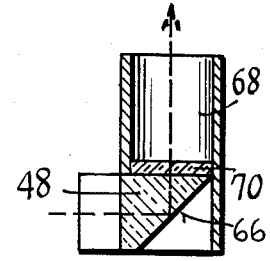
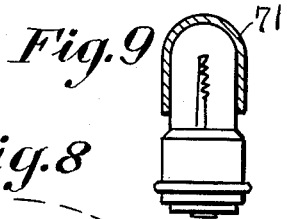
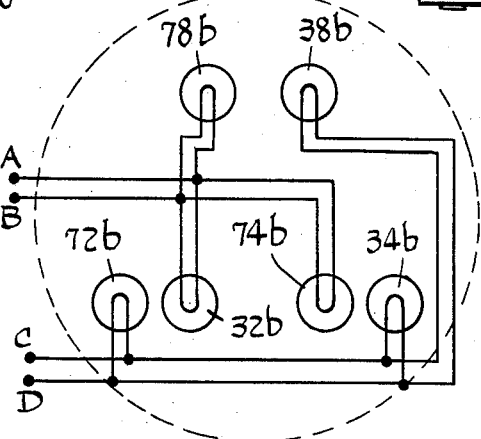
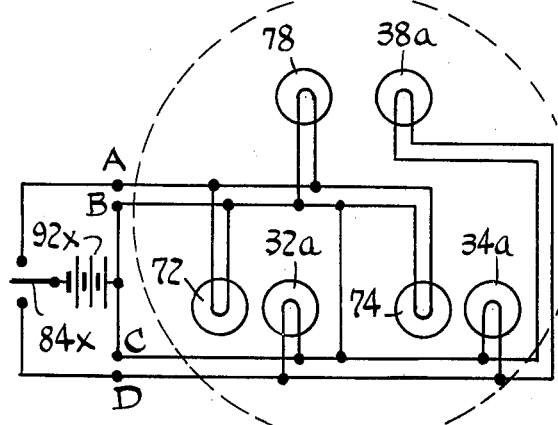
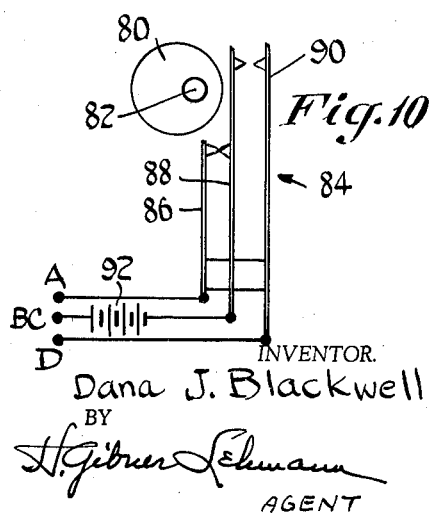
INVENTOR.
Dana J. Blackwell
BY
H. Gibner Lehmann
AGENT United States Patent Office 3,216,394
Patented Nov. 9, 1965

3,216,394
ILLUMINATED INDICATING INSTRUMENT
Dana J. Blackwell, Naugatuck, Conn., assignor to Lewis Engineering Company, Naugatuck, Conn., a corporation of Connecticut
Filed July 14, 1964, Ser. No. 382,561
7 Claims. (Cl. 116—129)

This invention relates to illuminated indicating instruments, and more particularly to instruments of this type wherein simultaneous illumination of a dial, and a pointer movable thereover, is effected.

The present invention relates to improvements in the illuminated instruments of my Patents Nos. 2,874,671, 2,914,021, and 3,143,098.

In these patents the instruments which are disclosed have pointers receiving their illumination through a central opening in a dial, from lamps located at the rear of the dial. The pointer axis and the axis or center of the dial coincide with each other, and the dial scale extends circularly, with its center also coincidental with that of the pointer and instrument movement.

The present invention involves indicators wherein there is eccentricity in that the pointer and aligned instrument movement are eccentrically located with respect to the dial and casing axis, and one object of the invention is to provide a novel and improved illuminated indicating instrument of this type, wherein a maximum degree of pointer and dial illumination is effected with relatively few lamps.

Another object of the invention is to provide an improved eccentric-axis type illuminated instrument as above, wherein extremely effective illumination of the eccentrically disposed pointer is had from lamps which are located in juxtaposition to the field of view of the scale and relatively remote from the pointer.

A feature of the invention resides in the provision of an improved illuminated indicating instrument in accordance with the foregoing, wherein the pointer illuminating means involving the dial illuminating lamps, may be readily adapted or modified to accommodate different instrument assemblages without departing from the basic principle of operation of said means.

Yet another object of the invention is to provide an improved illuminated instrument as characterized above, wherein light for the pointer is obtained from more than a single lamp, thereby resulting in the pointer illumination being independent of any one lamp and continuing despite a failure of one lamp.

Still another object of the invention is to provide an improved illuminated indicating instrument as outlined and having plural lamp illumination of the pointer, wherein more than one color of pointer illumination is readily possible and may be effected by a simple electrical switching function.

A still further object of the invention is to provide an illuminated indicating instrument of the type characterized, wherein a different pointer color illumination, as for example red, may be provided to constitute a danger signal.

Still another feature of the invention resides in the provision of an improved illuminated indicating instrument having multiple-lamp pointer illumination of different colors, wherein different light intensities for the pointer may be obtained to compensate for darker or lighter colors.

Yet another object of the invention is to provide an improved illuminated indicating instrument of the type set forth above, wherein a change of pointer illumination as well as a change of dial illumination to a danger-indicating color such as red may be readily effected in the simplest possible manner, and with great reliability.

Other features and advantages will hereinafter appear.

In the drawings accompanying this specification, similar characters of reference are used to designate like components throughout the several views, in which:

FIG. 1 is a fragmentary axial sectional view through an improved illuminated indicating instrument as provided by the invention.

FIG. 2 is a front elevational view of the instrument, physically turned on its axis through an angle of 90° as compared with the showing of FIG. 1.

FIG. 3 is a transverse sectional view, taken on the line 3—3 of FIG. 1.

FIG. 4 is a perspective view of the solid light-piping member incorporated in the instrument of FIGS. 1–3.

FIG. 5 is a sectional view, taken on the line 5—5 of FIG. 4.

FIG. 6 is a sectional view similar to that of FIG. 3, but showing another embodiment of the invention.

FIG. 7 is a schematic circuit diagram of the embodiment of FIG. 6.

FIG. 8 is a schematic circuit diagram illustrating a modification of the embodiment of FIGS. 6 and 7.

FIG. 9 is a sectional view of a domelike filter member, mounted in place on a small incandescent lamp, the latter being shown in side elevation.

FIG. 10 is a diagrammatic representation of a cam controlled switching arrangement for controlling the illumination of the instrument pointer, as for example to effect an indication of danger by changing the pointer light to red from white or another color.

Considering first FIGS. 1–3, the instrument of the invention is shown as comprising an outer cylindrical casing 10 in which there is contained an instrument movement 12 having a pivotal axis or center line 14 about which the movable element of the instrument (not shown) turns. Extending forward from the instrument movement 12 is a support arm 16 which is movable in an arcuate path and about the instrument axis 14.

In accordance with the present invention, the instrument axis 14 (which is the axis about which the support arm 16 turns) is located eccentrically with respect to the axis or center line 18 of the casing 10, being disposed an appreciable distance from the casing axis or below a horizontal diameter of the casing 10 when considering FIGS. 1 and 3.

Within the casing 10 and in front of the instrument movement 12 there is provided a dial 20 having a clearance space or opening 22 extending through it, which opening the support arm 16 occupies during its arcuate movement. The said clearance space or opening 22 in the dial 20 is disposed wholly at one side of and appreciably below (as viewed in FIGS. 1 and 3) a horizontal diameter of the dial 20 and casing 10. Considering FIG. 2, the clearance opening 22 is located wholly to the right of the vertical diameter of the dial 20 (corresponding to the horizontal diameter of FIGS. 1 and 3).

The dial 20 is adapted for lighting from the rear, as by making said dial transparent or translucent, either clear or with coloring. The dial 20 has on a major portion of its face (that visible in FIG. 2) a substantially arcuate and unbroken indicating area which is disposed mainly on the other or left side of the vertical diameter and which constitutes a large field of view provided with indicia 24 extending across the same.

Movable over the visible field shown in FIG. 2 and over the indicia 24 thereof is a pointer 26 which is firmly affixed to the support arm 16 at the front extremity thereof. The pointer 26 is constituted of a clear or transparent substance such as glass, plastic or the like and has a light reflecting means 30 adjacent its pivotal axis, as well as having an illuminable area along its length, by virtue of which the pointer may be lighted by a light beam directed at it from the rear of the dial through the clearance opening 22 thereof. Details of such pointer are given in my Patents Nos. 2,914,021 and 3,143,098. Accordingly, further description of such pointer is not set forth herein.

By the present invention, to the rear of the dial 20 and behind end portions of the arcuate indicating area and scale 24 there is disposed a pair of spaced-apart lamps 32, 34 which illuminate the rear of the dial 20 whereby light coming through the latter is visible at the front and makes readily visible the indicia 24. The said spaced apart lamps 32, 34 are located wholly above the level of the clearance opening 22 in the dial 20, in accordance with the invention.

There is further provided a cylindrical light shield 36 which is fitted in the said opening 22 and which extends rearward from the dial 20, the arrangement being such that the shield 36 may readily prevent most of the stray light of the higher-located lamps 32, 34 from passing forward through the clearance opening 22. The cylindrical light shield 36 surrounds the frontmost portion of the support arm 16 as clearly seen in FIG. 1, and by virtue of the relative disposition of the lamps 32, 34 in widely-spaced relation, appreciably above the level of the clearance opening 22, the light shield 36 may be relatively short in axial length and still remain effective in blocking such stray light.

In accordance with the invention, the spaced-apart lamps 32, 34 as specifically located above are utilized to provide a dual illumination of the pointer 26, as will be hereafter set forth in detail. Supplementing the light from the lamps 32, 34 is a third dial illuminating lamp 38, which is located behind the upper region of the dial when considering FIGS. 1 and 3, or behind the leftmost region when considering FIG. 2. The lamp 38 is not intended to contribute to the illumination of the pointer 26; instead, it supplements the dial lighting whereby illumination of the latter is effected by a total of three lamps spaced along the scale 24, providing an appreciable degree of uniformity of lighting of the scale.

In accordance with this invention, in conjunction with the offset arrangement of the instrument axis and clearance opening 30 of the dial 20 as compared with the central axis of the casing, there is provided a novel and improved solid light piping member of relatively simple structure, by which illumination of the pointer 26 is effected from the two lamps 32, 34, and whereby such pointer illumination will be continued regardless of whether both of the lamps 32, 34 are operative or only one is operative. Accordingly, a failure of one of the lamps 32, 34 will not render the instrument inoperative due to failure of lighting of the pointer 26.

The light piping member by which this is accomplished in conjunction with the eccentric disposition of the instrument movement, is shown in FIGS. 1 and 3–5. Such member is indicated as a whole by the numeral 40, and has generally an E-shape, pictured as lying on its long side as seen in FIG. 3. The light-piping member 40 is advantageously formed of a clear plastic substance, such as that known by the trademark "Plexiglas," which has the property of conducting light and also reflecting the same from smooth or polished surfaces. The member 40 has a generally straight or linear long side or body portion 42, upstanding legs 44, 46 and an upstanding short central portion 48. In FIG. 3 the legs 44, 46 are disposed respectively below the lamps 32, 34 in order to receive light from the latter, said legs having rounded lens-like end surfaces 50, 52 respectively to effect a better collection of the light.

At the two remote corners 54, 56 of the member 40, flat reflector means 58, 60 are provided. The reflectors 58, 60 comprise flat polished surfaces which direct the light that extends downward through the legs 44, 46 (considering FIG. 3) at right angles and toward the center portion 48 of the member.

The said center portion 48 is also provided with flat reflector surfaces 62, 64 which redirect the directed light of the body portion 42 in an upward direction toward the upper extremity of the center portion 48, that is, in directions parallel to the legs 44, 46. A fifth flat reflecting surface 66 is provided at the extremity of the center portion 48, to direct the redirected light laterally or upward of the member 40 as viewed in FIG. 4 (or in a left direction as viewed in FIG. 1).

The light as thus reflected three times passes forward through the clearance space 22 of the dial, and strikes a rear receiving surface 68 of the pointer. When such light, which may be thought of as of double strength when considering a single lamp, enters the pivotal portion of the pointer and is reflected by the surface 20 thereof, it passes along the length of the pointer 26 and illuminates the same.

For the purpose of confining such light, as it travels from the two lamp sources 32, 34 to the receiving surface 68 of the pointer, the legs 44, 46 and the body portion 42 of the light piping member 40 are preferably coated with a black opaque enamel, except for the reflector surfaces, and a cylindrical shield or light guide 68 is mounted on the member 40, extending laterally or upward therefrom as viewed in FIG. 4 (or forwardly as seen in FIG. 1). To color the light which illuminates the pointer 26, a translucent filter disk 70 may be provided in the light guide 68, as seen in FIG. 5. For example, the filter 70 may provide a blue-white illumination for the pointer, and in contrast thereto the coloring of the dial 20 may be such that the light therefrom has a reddish coloring.

In place of the disk filter 70 by which independent coloring of the pointer is obtained, a common coloring of both the pointer and the dial is possible by utilizing dome-shaped filter covers over the lamps, such as the filter cover 71 shown in FIG. 9. The cover 71 has a cylindrical body portion and a rounded end, and may be conveniently fabricated of heat-resistant colored plastic of translucent quality.

By virtue of the provision of the E-shaped light-piping member with the short center portion 48 and the long legs or extremities 44, 46, the lamps 32, 34 may be advantageously located directly behind those portions of the dial 20 which require the best illumination while at the same time these same lamps provide for effective illumination of the offset pointer whose axis is disposed remote from the major indicia-carrying field of the dial. The dial experiences a desirable, strong and substantially uniform light from the three lamps 32, 34 and 38, and in addition two of the said lamps also provide an adequate illumination of the pointer. The light-piping member 40 is of relatively simple construction, and has been found to be extremely effective in providing the necessary pointer illumination.

Another embodiment of the invention is illustrated in FIGS. 6 and 7. This embodiment differs from that of FIGS. 1–5 in that a duplicate set of three lamps is provided, as well as a modified E-shaped light-piping member which is adapted to receive light from four lamps, preferably two at a time. As shown, one set of three lamps 32a, 34a, 38a is provided for use behind a dial like the dial 20, and respectively adjacent the first set there is disposed a second set of three lamps 72, 74 and 78. The lamps of the two sets are paired, with the pairs occupying generally the same positions or locations indicated for the lamps 32, 34, 38 of FIGS. 1–5.

A modified E-shaped member 40a has legs 44a and 46a of tapering construction, each leg having two convex or double faces 50a, 52a. The double convex faces 50a are associated respectively with the lamps 32a and 72 whereas the convex faces 52a are associated respectively with the lamps 34a, 74. The circuit connections for the lamps of each set are shown in FIG. 7, indicating that the sets may be energized separately.

A manually operable switch 84x and a battery 92x in the circuit enable selective energization of the pairs of lamps 32a, 34a and 72, 74 to be readily manually effected from a remote point.

The lamps 32a, 34a, 38a may, for example, be provided with red dome-shaped filters whereby they give out a light which is different from the lamps 72, 74, 78. Thus, by energizing one or the other of the sets of lamps shown in FIG. 7, the illumination of the pointer as effected by the E-shaped light-piping member 40a may be either of red color, or else of another color or white.

The light output from the E-shaped member 40a is kept uniform, considering energization of one or the other of the two sets of lamps, because of the parallel light paths provided in the legs 44a, 46a regardless of which set of lamps is energized. If, instead, it is desired to effect a compensation of the light intensity because of different colors, an alternative circuit arrangement may be utilized, as illustrated in FIG. 8. Here, lamps 32b and 74b comprising two inner units are simultaneously energized, or else lamps 72b, 34b comprising two outer units. Such energization changes the concentration of the light output from the light-piping member 40a. Using the two inner lamps 32b, 74b a light concentration would be effected at one center point of the mid-portion of the light-piping member 40a, whereas when the two outer lamps 72b, 34b are simultaneously energized there would be two light concentrations spaced apart on the output portion or face of the member 40a. Thus, with the organization of FIGS. 6–8 wherein pointer illumination is effected by at least two lamps, there is the advantage that more than one color is available to light the pointer.

In accordance with the invention, the multiple lamp arrangement of FIG. 7 may be utilized to automatically effect a red illlumination of the pointer for the purpose of giving a danger signal, where the instrument movement is of a character, such as a servo-motor or the like, which has enough power to operate a cam or equivalent device. In FIG. 10 such a cam is shown at 80, being carried by a shaft 82 of the instrument movement 12. A cam-operated switch 84 has contacts 86, 88 which are separated in response to clockwise turning of the cam 80, and has an additional contact 90 which is joined to the contact 88 by such movement. The switch contact 88 is connected to a battery 92, from which a wire leads to a terminal B, C. Such terminal may be connected to the similarly lettered terminals B, C of FIG. 7. The switch contact 86 is connected to terminal A and the switch contact 90 connected to terminal D, these being in turn connected to the similarly lettered terminals in FIG. 7. The lamps 32a, 34a and 38a may, for example, provide a red coloring to the pointer and dial, as by providing such lamps with translucent red plastic domes like the dome 71 shown in FIG. 9.

With such arrangement, when the instrument movement attains an extreme advanced position, as in responding to a dangerous temperature or other condition, the cam 80 will separate the contacts 86, 88 and connect together the contacts 88, 90. The illumination initially effected by connection between the contacts 86, 88 may have provided a blue-white light through energization of the lamps 72, 74, 78. Upon such connection being broken by the cam 80 and the connection being established between the contacts 88, 90, the blue-white illumination of the dial and pointer may be replaced by a red illumination as the lamps 32a, 34a, 38a are energized instead of the lamps 72, 74, 78. Thus, the change in the color of the illumination may constitute an advantageous danger signal, and the change in illumination involves not only the dial but also the movable pointer which travels across the dial. Such pointer will, of course, upon changing its illumination to red, be disposed at the extreme end of the scale in responding to the dangerous temperature or other condition.

In each of the embodiments of the invention there is effected a maximum illumination of the dial from the rear by relatively few bulbs in an arrangement where the instrument axis is spaced an appreciable distance from the dial axis, together with the advantage of having two lamps for pointer illumination, which latter represents a desirable safety feature. Besides having a choice of colors as between the pointer illumination and the dial illumination it is also possible by means of the invention to have more than one color for lighting the pointer. The organization is simple in construction, economical to fabricate, and reliable in its operation.

Variations and modifications may be made within the scope of the claims, and portions of the improvement may be used without others.

I claim:

1. An illuminated indicating instrument comprising, in combination:
   (a) a support arm movable in an arcuate path and about a pivotal axis of the instrument,
   (b) a dial having a clearance space extending through it and through which the support arm extends during its movement, said clearance space being disposed wholly at one side of a diameter of the dial,
   (c) said dial being adapted for lighting from the rear and having on a major portion of its face a substantially arcuate unbroken indicating area disposed mainly on the other side of said diameter and constituting a large field of view provided with indicia extending across the same,
   (d) a pair of spaced-apart lamps disposed to the rear of the dial behind end portions of said arcuate indicating area,
   (e) a pointer carried by the support arm at the front of the dial and movable over said indicating area,
   (f) said pointer having a light-reflecting means adjacent its pivotal axis and an illuminable area along its length, by which the pointer may be lighted by a light beam directed at it from the rear of the dial,
   (g) a substantially E-shaped solid light-piping member located at the rear of the dial and lying in a plane parallel to the dial, the ends of the two legs of said member being adjacent the lamps to receive light therefrom and the center portion of the member being to the rear of said clearance space of the dial,
   (h) said member having reflectors at its two remote corners to direct said light toward the center of the member, having reflectors at its center portion to redirect said directed light as a substantially single beam of double strength toward the tip of the center portion, and having an additional final reflector at said center portion to direct the said redirected light laterally of the member, through the clearance space of the dial and against the pointer, thereby to light the latter with at least half the said double strength regardless of whether both of the lamps are operative or only one is operative.

2. The invention as defined in claim 1, wherein:
   (a) a cylindrical hollow light shield is provided, encircling the final reflector and extending therefrom in a direction toward the pointer,
   (b) said dial having a cylindrical hollow light shield extending from the clearance space toward the E-shaped member and telescopically receiving the light shield of said member.

3. The invention as defined in claim 1, wherein:
   (a) an additional pair of spaced-apart lamps is provided, juxtaposed respectively to the first-mentioned pair,
   (b) said legs of the E-shaped light-piping member having widened ends adapted to receive and transmit light from either the lamps of the first pair or else the lamps of the additional pair,
   (c) circuit control means for switching on one or the other of the pairs of lamps, and (d) means coloring the light from one pair of lamps differently from the other pair.

4. The invention as defined in claim 3, wherein:
(a) means are provided, operable concurrently with the pointer, for automatically operating said circuit control means to switch off one pair of lamps and to switch on the other pair when the pointer attains a predetermined position.

5. The invention as defined in claim 3, wherein:
(a) the lamps of the pairs are arranged with respect to the legs of the E-shaped light-piping member to effect different intensities of light output from the member.

6. The invention as defined in claim 3, wherein:
(a) the end of each leg of the E-shaped member has a pair of lens formations, one formation for each lamp associated with the legs.

7. The invention substantially as illustrated and described.

No references cited.

LOUIS J. CAPOZI, *Primary Examiner.*